Figure 1:
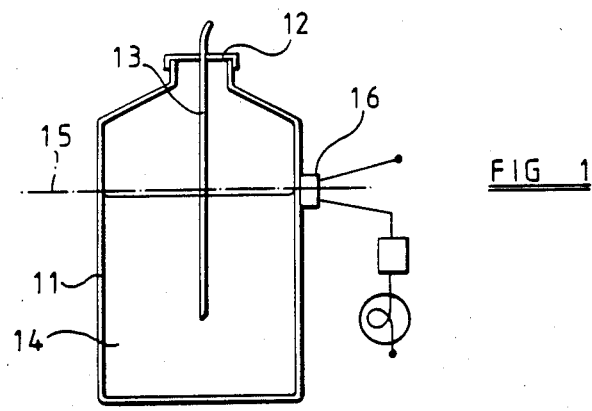

United States Patent [19]

Williams

[11] Patent Number: 4,788,444
[45] Date of Patent: Nov. 29, 1988

[54] LIQUID LEVEL DETECTION

[75] Inventor: David G. Williams, Birmingham, England

[73] Assignee: Lucas Electrical Electronics and Systems Limited, Birmingham, England

[21] Appl. No.: 943,097

[22] Filed: Dec. 18, 1986

[30] Foreign Application Priority Data

Dec. 18, 1985 [GB] United Kingdom ............. 8531170
Mar. 12, 1986 [GB] United Kingdom ............. 8606021

[51] Int. Cl.$^4$ ............................................. G01H 15/06
[52] U.S. Cl. ..................................... 250/577; 73/293; 340/619
[58] Field of Search ................. 250/577; 73/293; 340/619; 356/128, 135, 136

[56] References Cited

U.S. PATENT DOCUMENTS 4,123,227 10/1978 Heim et al. ........................ 250/577
4,440,022 4/1984 Masom ............................. 250/577
4,485,856 12/1984 Dulian et al. ...................... 250/577

Primary Examiner—Edward P. Westin
Assistant Examiner—Khaled Shami
Attorney, Agent, or Firm—Holman & Stern

[57] ABSTRACT

A sensor for detecting liquid at a predetermined level in a container, including an emitter, a receiver sensitive to the emission of the emitter, a support member positioned at the exterior of a region of the wall of the container transparent to the emission with, the emission of the emitter so disposed in relation to the interior surface of the wall region of the container that when the region is a container/liquid interface then emissions from the emitter generally in the direction of the emission axis will pass through the interface and will be dissipated in the liquid, but when the interface is a container/air interface such emissions will be totally internally reflected from the interface. The receiver is also carried by the support member, the receiver being sensitive to the emissions of the emitter so as to produce an output either when such emissions are incident thereupon, or alternatively when such emissions are absent and the arrangement being such that said receiver can only receive emissions from said emitter which have first been totally internally reflected from said interface, there being only a single reflection between emitter and receiver. There is also disclosed an inductor system which may make use of the sensor.

11 Claims, 4 Drawing Sheets

U.S. Patent  Nov. 29, 1988  Sheet 1 of 4  4,788,444

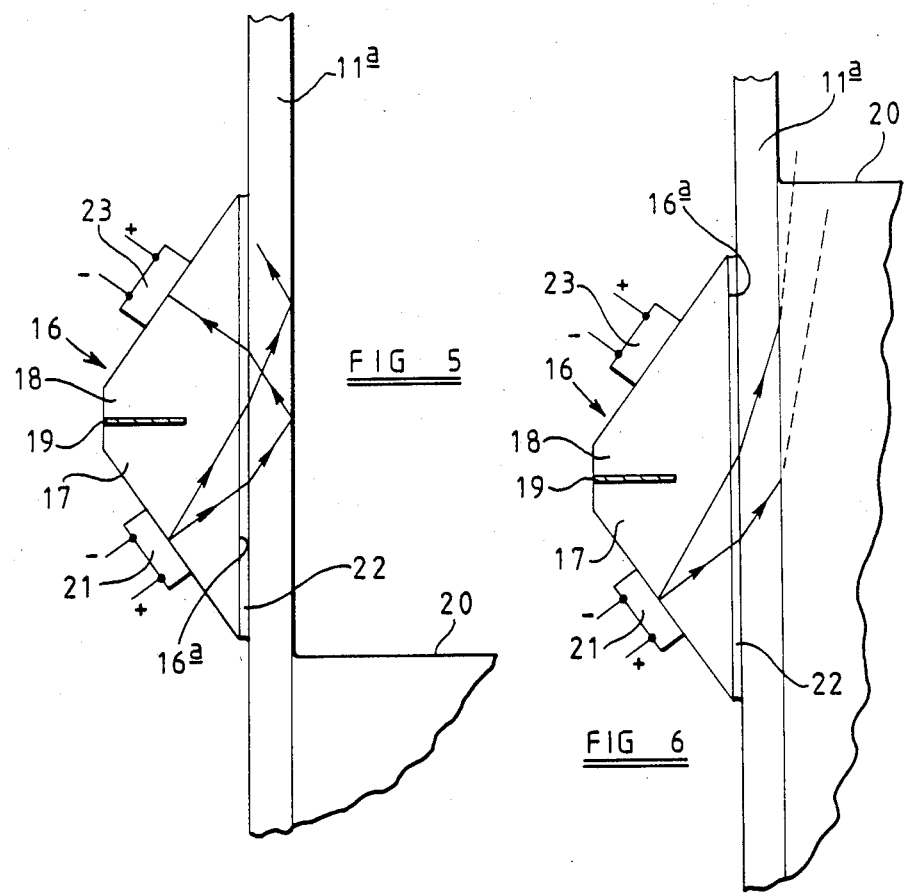
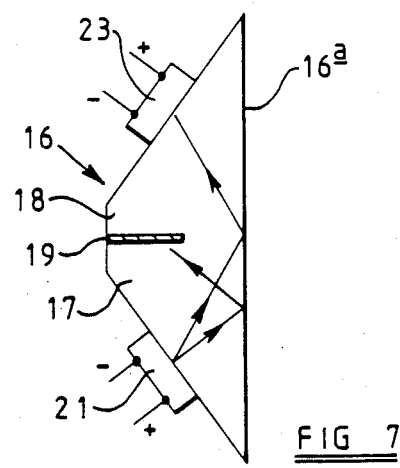

LIQUID LEVEL DETECTION

This invention relates to apparatus for use in detecting the presence or absence of liquid at a predetermined level in a container.

Known systems for monitoring fluid level in a container include the use of electrical devices such as float operated switches and capacitive probes. Such techniques are disadvantageous in that they require some part of the system, the float or the capacitive probe, to extend within the container and thus mechanical and/or electrical connections must be made through the wall or closure member of the container, in turn necessitating the use of sealing devices for example sealing grommets. Particularly in an automobile environment sealing grommets are prone to leakage both as a result of ageing and deterioration of the grommet, and by virtue of movement of the grommet for example as a result of severe vibration. An object of the present invention is therefore to provide a sensor, and a system utilizing the sensor, whereby the level of liquid in a container can be monitored without physical contact with the monitored liquid, the apparatus being sufficiently robust to survive the under-bonnet environment of a road vehicle.

The invention makes use of an emitter, and a receiver for receiving the reflected emissions of the emitter. We are aware of previous attempts to achieve liquid level monitoring using this principle, and there have for example been a number of attempts utilizing optical probes which are introduced into the container. Naturally these suffer from the disadvantages mentioned above in respect of capacitive probes. There have also been attempts such as disclosed in British patent application No. 2099791A which involve reflection from the liquid surface. The approach chosen in British specification No. 2099791A necessitates either an open container, which of course will be totally unsuitable for use in a road vehicle application, or alternatively the use of a sealed container with the sensor means 19 positioned within the container thus giving rise to the sealing problems mentioned previously. Naturally where a probe or sensor is actually exposed to the liquid then its design and construction must be such that it is undamaged by its exposure to the liquid.

In accordance with a first aspect of the present invention there is provided a liquid sensor comprising, a support member, positioned in use at the exterior of a region of a liquid container which is transparent to the emission of an emitter carried by the support member, the emitter being in such a position that in use the emission axis of the emitter is so disposed in relation to a predetermined region of the interior surface of the container with which the sensor is associated that when said region is a container/liquid interface then emissions of said emitter generally in the direction of said axis will pass through the interface and will be dissipated in the liquid, but when said interface is a container/air interface such emissions will be totally internally reflected from the interface, and, the sensor further including a receiver carried by said support member, said receiver being sensitive to the emissions of said emitter so as to produce an output either when such emissions are incident thereupon, or alternatively when such emissions are absent and the arrangement being such that said receiver can only receive emissions from said emitter which have first been totally internally reflected from said interface, there being only a single reflection between emitter and receiver.

Preferably said emitter emits light in the infrared wave lengths.

Desirably said support member is a component for attachment to an outer surface of a wall section of the container, transparent to said emissions of the emitter.

Alternatively said support member is an externally accessible, integral part of a wall region of the container, said wall region being transparent to the emissions of the emitter.

Preferably said support member includes baffle means preventing light emitted by the emitter being incident directly upon the receiver.

Conveniently said baffle means comprises an opaque member positioned between the receiver and the emitter.

Preferably where said support member is separate from the wall of the container said baffle means terminates short of the surface of the support member which engages the liquid container in use, so that should the support member become detached from the container in use then emissions from the emitter can be reflected back from the support member/air interface to be incident upon the receiver.

Preferably said receiver produces an electrical output when emissions from said emitter are incident upon the receiver.

Preferably said receiver includes a photo-diode which is electrically conductive when said emissions are incident thereupon, and so produces an electrical output signal.

The invention further resides in an indicator system for indicating the presence or absence of liquid at a predetermined level in a container, the system comprising a sensor as specified in any one of the preceding paragraphs, a comparator comparing the output of the receiver with a reference value, and an indicator device operation of which is controlled by the output of the comparator.

Preferably the comparator is arranged to exhibit hysteresis such that the indicator device is switched on and off at different output levels respectively of the sensor.

Alternatively the system includes latching means whereby the indicator device, once rendered operative, remains operative until manually reset.

Desirably the system includes means whereby in order to effect a change in the operative state of the indicator device the changed operative state of the sensor must have persisted for a predetermined period of time.

Preferably the system is so arranged that return of the sensor to its first state within said predetermined period of time immediately negates the effect of the previous change of state in that for a subsequent change of state, from said first state, the time period during which the changed state must prevail, before the operative state of the indicator device is changed, is recommenced.

In accordance with a further aspect of the present invention there is provided an indicator system for indicating the presence or absence of liquid at a predetermined level in a container, the system comprising a sensor which produces an electrical output signal either when liquid is present at the predetermined level, or alternatively when liquid is absent at the predetermined level, a comparator which compares the output signal from the sensor with a predetermined reference, and an indicator device operable by the output of the comparator, the sensor thus having first and second alternative operative states, and the indicator having alternative first and second operative states, and the system being so arranged that in order to effect a change in the operative state of the indicator device, a change in the operative state of the sensor must persist for a predetermined length of time, and furthermore the system being such that a return of the sensor to the previous operative state before elapse of predetermined period of time negates the effect of the previous change of state of the sensor in that a subsequent change of state of the sensor must persist for the full predetermined period of time before a change in operative state of the indicator device is effected.

Figure 2:
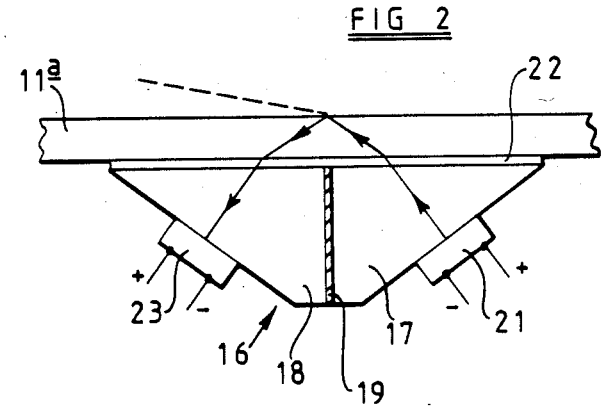
Figure 3:
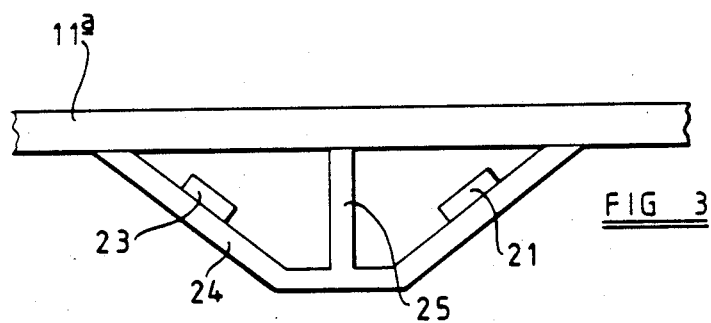
Figure 4:
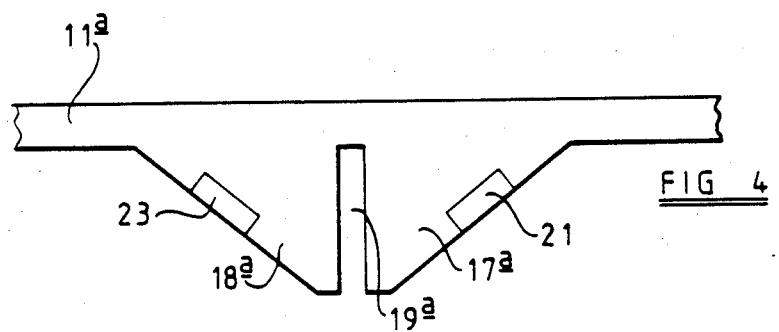
Figure 8:
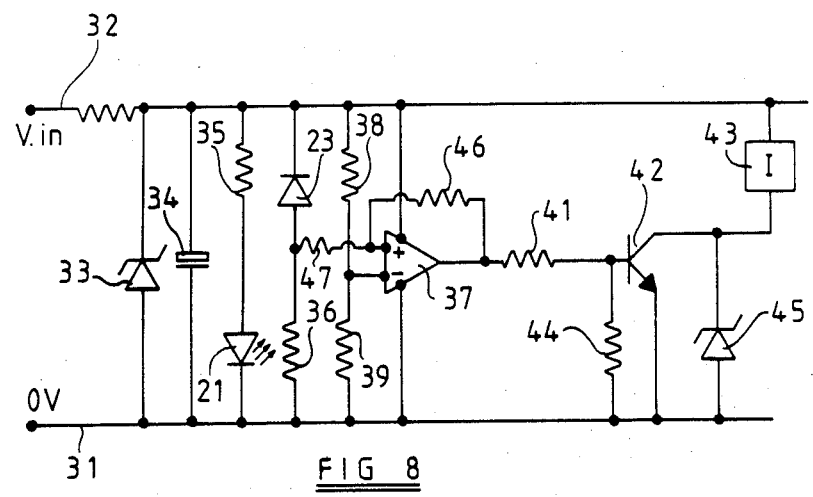
Figure 9:
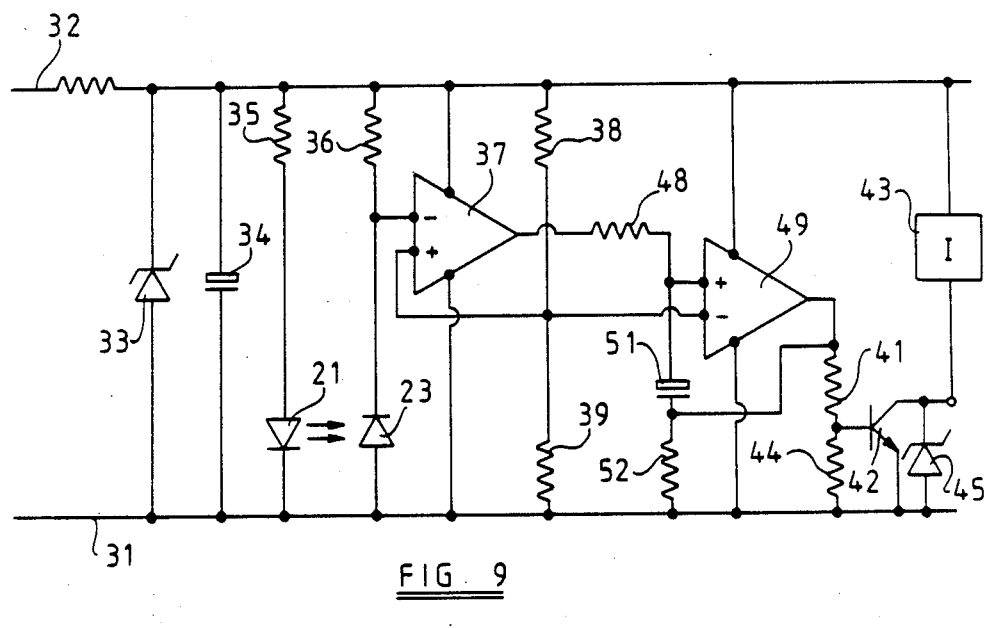
Figure 10:
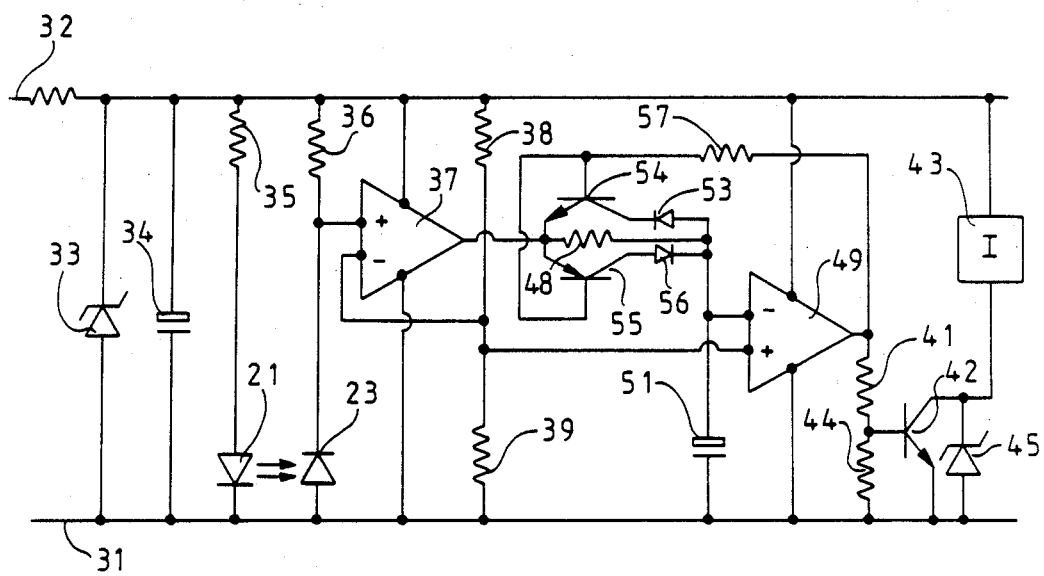

One example of the invention is illustrated in the accompanying drawings wherein FIG. 1 is a diagrammatic sectional view of the header tank of the cooling system of an internal combustion engine, FIG. 2 is an enlarged sectional view on a horizontal plane of the header tank shown in FIG. 1, FIGS. 3 and 4 are views similar to FIG. 2 of alternatives thereto, FIGS. 5, 6 and 7 are views similar to FIG. 2 of a further modification, and FIGS. 8, 9 and 10 are circuit diagrams respectively of three alternative comparator circuits capable of use with the sensors illustrated in FIGS. 1 to 7.

Referring first to FIGS. 1 and 2 of the drawings, the header tank 11 is a moulded synthetic resin container, the synthetic resin material being transparent. The tank 11 is closed at its upper end by a cap 12 through which extends a pipe 13 by way of which coolant liquid 14 can enter and leave the tank 11. The coolant liquid 14 will of course normally be water, often containing additives to resist corrosion in the internal combustion engine, and also to resist freezing of the coolant. The desired minimum level of coolant within the tank 11 is illustrated by the chain dotted line 15 in FIG. 1. A sensor 16 is attached to the outer wall of the tank 11 in the region of the predetermined level 15.

In the interests of simplicity FIGS. 2, 3 and 4 assume that the wall region 11a of the tank 11 to which the sensor 16 is attached is a planar region. It is to be understood that where the wall region is curved then appropriate modifications will be made to the sensor.

The sensor comprises a pair of transparent, moulded synthetic resin, right-angle prisms 17, 18 positioned back-to-back. One face of each of the prisms 17, 18 is presented to the wall region 11a, the two surfaces being co-planar. The prism surfaces at right angles to the wall region 11a which are presented towards one another, are separated by an opaque layer 19 which may simply be a layer of opaque paint on one or both prisms.

Secured to the inclined face of the prisms 17 is an emitter 21 in the form of a light emitting diode which, when appropriately energised, emits infra-red radiation. It will be recognised that the infra-red radiation may be of a wave length outside the visible spectrum, and thus the terms "light", "opaque", and "light conductive" should be construed accordingly. In order to ensure optical continuity between the transparent material of the prisms 17, 18 and the transparent material of the wall region 11a, a layer of transparent gel or grease 22 is interposed between the prisms and the wall region 11a and avoids the presence of an air gap at this point. The refractive index of the gel or grease 22 is chosen to be similar to that of the material of the prisms which in turn is similar to that of the material of the wall region 11a.

It will be recognised that the LED 21 can be considered to have an optical axis, and by mounting the LED 21 on the inclined face of the prism 17 the optical axis of the LED is normal to the inclined face of the prism 17. Thus the optical axis of the LED 21 extends at an angle towards the wall region 11a. The angle which the inclined face of the prism 17 makes with respect to the wall region 11a is such that rays of light from the LED 21, extending parallel to the optical axis of the LED 21, will pass through the prism 17, the gel 22, and the thickness of the wall region 11a, and will be incident upon the surface of the wall region 11a remote from the prism 17. Thus the light from the emitter 21 is incident upon the inner surface of the wall of the tank 11. If coolant exists at the level 15 then light from the emitter 21 will be incident upon a synthetic resin/coolant interface whereas if the coolant level is below the level 15 then light from the emitter 21 will be incident upon a synthetic resin/air interface. The angle of the inclined face of the prism 17 is so chosen in relation to the refractive indices of the material of the prism 17, the gel 22, and the material of the wall region 11a, that the angle of incidence of light on the interface will give rise to total internal reflection from the interface when the interface is a synthetic resin/air interface, but will give rise to transmission of the incident light when the interface is a synthetic resin/coolant interface. Thus where coolant is present at the level 15 light from the emitter 21 will be transmitted into the coolant and will be disipated in the coolant, whereas in the absence of coolant at the level 15 light from the emitter 21 will be totally internally reflected from the inner face of the wall region 11a.

The prism 18 is a mirror image of the prism 17, and on its inclined face carries a receiver 23 in the form of a photo-diode sensitive to the wavelengths emitted by the emitter 21. The prisms 17, 18 and the emitter 21 and receiver 23 are so arranged that a ray of light coextensive with the optical axis of the emitter 21 will strike the inner face of the wall region 11a immediately beneath the opaque baffle member 19, and thus in the absence of coolant at the level 15, would be reflected back to pass along the optical axis of the receiver 23. Such a ray is illustrated in FIG. 2. When "illuminated" by the emissions from the emitter 21, the photo-diode 23 becomes electrically conductive, and thus can be used to provide an electrical output signal which is dependent upon the presence, or alternatively upon the absence, of light, and therefore upon the presence, or absence of coolant at the level 15. Any convenient means, for example an opaque external housing, can be used to secure the prisms 17, 18 together and to secure them to the wall of the tank 11.

In the modification illustrated in FIG. 3 the prisms are dispensed with, and an opaque housing 24 having an internal opaque partition 25 carries the emitter 21 and receiver 23 on appropriately inclined internal surfaces thereof. The angles of the surfaces carrying the emitter and receiver will not be the same as those of the faces of the prisms 17, 18 of FIG. 2 since in the FIG. 3 arrangement the light conduction paths include an air/synthetic resin interface between the emitter 21 and the outer surface of the wall region 11a and between the outer surface of the wall region 11a and the receiver 23.

FIG. 4 illustrates a further alternative in which components equivalent to the prisms 17, 18 are integral with the wall region 11a. Such an arrangement of course dispenses with the need for the gel layer 22, but renders the production the tank 11 more complex. As is apparent from FIG. 4 the emitter 21 and receiver 23 can, if desired, be received in appropraite recesses in the inclined faces of the prism portions 17a, 18a, and the opaque baffle means between the prism portions 17a, 18a, may simply be provided by a slot 19a. However, if desired an opaque member may be introduced into the slot 19a. It will be recognised that the opaque baffle means 19, 25, 19a, in the arrangement of FIGS. 2, 3 and 4 respectively in each case is intended to prevent radiation from the emitter 21 reaching the receiver 23 without first having been reflected from the inner face of the wall region 11a. Such opaque baffle means is of particular importance where, as normally will be the case, the emitter 21 does not provide a collimated output. In all cases only a single reflection occurs between the emitter and the receiver.

It will be recognized that the container is likely to be in such a position in the engine compartment of the vehicle that the attached, rather than integral, sensor (FIGS. 2 and 3) may be vulnerable to being accidentally dislodged from the container wall for example by a mechanic when servicing other items within the engine compartment of the vehicle. It is found that if the sensor is detached from the container a false indication of a satisfactory liquid level in the container can be given since no illumination of the receiver occurs. The arrangement illustrated in FIGS. 5, 6 and 7 is a modification of the FIG. 2 arrangement intended to overcome this problem. Referring to FIGS. 5 to 7 it will be noted that the sensor still comprises a pair of transparent moulded synthetic resin, right-angle prisms 17, 18 positioned back-to-back, although it is to be understood that the prisms can, if desired, be parts of a single moulded component having a slot extending inwardly from its rear face to receive the opaque layer 19 constituting baffle means. It will be noted that the baffle means 19 terminates short of the "container" face 16a of the sensor 16, rather than extending completely to the face 16a as is the case in the FIG. 2 arrangement.

As is evident from FIG. 5 when the liquid level 20 is too low rays of light from the emitter 21 will pass through the "container" face 16a of the sensor 16, the gel layer 22, and the thickness of the wall region 11a, and will be totally internally reflected at the container-/air interface. Thus some of the rays of light will be reflected back to the receiver 23 and as described above a warning that the liquid level is too low will be generated as a result of light from the emitter 21 being incident upon the receiver 23.

Where the liquid level 20 is sufficiently high, as shown in FIG. 6, light striking the inner face of the wall region 11a will pass through the container/liquid interface and will be dissipated within the liquid 20 so that no light is reflected back onto the receiver 23. In both instances it will be recognized that in optical terms as described with reference to FIG. 2, the material of the prisms 17, the gel layer 22 and the wall thickness of the wall region 11a act as a substantially homogeneous medium. There may be slight changes in refractive index between the various components, and these are indicated by showing the light rays refracted at the boundries, but the arrangement is such that internal reflection at these boundaries cannot occur.

Reverting briefly to FIG. 2, and assuming that the sensor 16 becomes detached from the wall region 11, then it will be recognized that although some light from the emitter 21 may be totally internally reflected at the now exposed face of the prism 17, this internally reflected light will not reach the receiver 23 by virtue of the baffle means 19 extending completely to the "container" face 16a of the prisms. However, as illustrated in FIG. 7, since the baffle means 19 is shortened so as to terminate short of the face 16a, in the situation where the sensor 16 becomes detached, internal reflection of light from the emitter 21 can take place at the prism/air interface (at the surface 16a) and totally internally reflected light can reach the receiver 23. Thus in these circumstances light from the emitter 21 is incident upon the receiver 23 thereby giving rise to a low liquid level warning. It may be of course that the liquid level in the container is actually sufficiently high, but nevertheless the giving of a low liquid level warning will prompt the operator to check the liquid level, and upon realizing that the liquid level is sufficiently high the operator will then naturally check the sensor 16 and will find that the sensor 16 has become detached.

The arrangement whereby a warning signal is given when light falls on the receiver 23 is as described below. Thus, the receiver may produce an output when no light falls thereon and the low level warning may be generated as a result of disruption of the signal from the receiver arising from light falling on the receiver.

It will be noted that while the baffle means is shortened to permit reflection on the surface 16a in the event that the sensor 16 is detached from the container, the baffle means 19 must be sufficiently long to prevent light passing from the emitter to the receiver without first being reflected. The baffle means can take a wide variety of different forms, and, for example may be a layer of paint in a groove in a common prism member or alternatively may be an opaque insert in such a groove. Where the prisms 17, 18 are separate from one another, then their mutually presented faces may be recessed so that the groove or slot to receive the baffle means is defined when the two prisms are placed back-to-back. In such an arrangement of course one prism may simply be provided on its abutting face with an appropriately shaped area of opaque paint. Using such an arrangement however it will be necessary to ensure that adjacent the face 16a the two prisms are sufficiently optically linked to permit reflection from the face 16a when appropriate.

FIG. 8 illustrates a convenient electrical circuit for use in association with any of the sensor arrangements described above. In FIG. 8 the circuit includes a first supply rail 31 which in use is grounded, and a second supply rail 32 the voltage of which is positive by comparison with the rail 31. A zener diode 33 and a capacitor 34 are connected across the rails 31, 32 to provide voltage stablization. The cathode of the LED emitter 21 is connected to the rail 31, and its anode is connected through a resistor 35 to the rail 32. Thus the LED emitter 21 conducts and emits radiation, the resistor 35 limiting the current flow in the LED 21. The cathode of the photo-diode 23 is connected to the rail 32 and its anode is connected to the rail 31 through a resistor 36. A point intermedate the resistor 36 and the anode of the photo-diode 23 is connected to the non-inverting input of an operational amplifier 37 connected between the rails 31 and 32. Resistors 38, 39 are connected in series between the rails 31, 32, and a point intermediate the resistors 38, 39 is connected to the inverting input of the amplifier 37. The output of the amplifier 37 is connected through a resistor 41 to the base of an n-p-n transistor 42 the emitter of which is connected to the rail 31 and the collector of which is connected through an indicator device 43, conveniently a bulb, to the rail 32. A resistor 44 is connected between the base of the transistor 42 and the rail 41 and a zener diode 45 is connected between the collector of transistor 42 and the rail 31 so as to protect the collector-emitter of the transistor 42. A feed back path containing resistor 46 is provided between the output of the amplifier 37 and the non-inverting input of the amplifier 37, and a resistor 47 is provided in the connection between the non-inverting input and said point intermediate the anode of the photo-diode 23 and the resistor 36.

It will be recognised that when no light from the LED 21 falls on the photo-diode 23 then the photo-diode is non-conductive and the voltage at the non-inverting input of the amplifier 37 will be the voltage at the rail 31, and thus will be lower than the voltage at the inverting input. Thus the output of the amplifier 37 will be low and by virtue of the resistor 44 the transistor 42 remains off and thus the indicator 43 is not energized. However, when light falls on the photo-diode 23 it conducts raising the voltage at the non-inverting input of the amplifier 37 above the voltage at the inverting input so that the output of the amplifier 37 goes high causing transistor 42 to conduct and thereby energizing the indicator 43. The feed back path by way of the resistor 46 provides hysteresis in the system so that the intensity of "illumination" of the photo-diode 23 at which the device 43 is energized is greater than that at which the output of the amplifier 37 is caused to go low and thus switch off the device 43.

In a modification of the circuit illustrated in FIG. 8 the resistor 46 is replaced by a diode having its anode connected to the output of the amplifier 37 and its cathode connected to the non-inverting input. In the modification therefore the feed-back by way of the diode provides a latching effect, it being understood that the value of the resistor 47 may need to be varied from that chosen for use in FIG. 8, the latching effect being such that once the output of the amplifier 37 has gone high it is maintained high until the power supply to the amplifier 37 is interrupted. Thus assuming that the liquid level being monitored falls permitting total internal reflection to occur thus giving rise to "illumination" of the photo-diode 23 then the output of the amplifier 37 will go high turning on the transistor 42 and so energizing the device 43. The device 43 will then remain energized by virtue of the output of the amplifier 37 remaining high until the power supply to the amplifier 37 is interrupted, for example by opening of the ignition switch of the vehicle incorporating the system.

The systems described above are suscepitible to operation by transient changes in liquid level, for example arising from movement of the coolant in the tank 11 as the vehicle negotiates a curve. The circuit illustrated in FIG. 9 minimises this problem. Components common to the circuit of FIG. 8 carry the same reference numerals and can be seen that the output of the amplifier 37 is connected by way of a resistor 48 to the non-inverting input of a second operational amplifier 49 also connected between the rails 31, 32. The non-inverting input of the amplifier 49 is connected by way of a capacitor 51 and a resistor 52 in series to the rail 31, a point intermediate the capacitor 51 and resistor 52 being connected to the output of the amplifier 49 through a resistor 58 of approximately the same value as resistor 52. It will be noted that the positions of the resistor 36 and photo-diode 23 have been reversed by comparison with FIG. 8, and the point intermediate the photo-diode 23 and resistor 36 is connected to the inverting input of the amplifier 37. The non-inverting input of the amplifier 37 is connected to a point intermediate the resistors 38 and 39, which point is also connected to the inverting input of the operational amplifier 49.

Conduction of the photo-diode 23 causes the output of the amplifier 37 to go high thereby charging the capacitor 51. Thus while the output of the amplifier 37 remains high the voltage at the non-inverting input of the amplifier 49 will rise as the capacitor 51 charges until a point is reached at which the output of the amplifer 49 goes high whereupon the transistor 42 conducts energizing the device 43. Thus it will be recognised that the photo-diode 23 must remain conductive for a predetermined period of time, determined by the capacitor 51, before the device 43 will be energized. Similarly after the output of amplifier 49 has gone high the junction of resistors 52 and 58, and hence the non-inverting input of amplifer 49 is subjected to a positive step of approximately half the voltage appearing between the rails 31 and 32, charging the capacitor 51. Capacitor 51 must therefore discharge to a voltage of about half of the voltage between the rails before indicator device 43 is deenergized. The time constant of the circuit can be chosen such that the device will not be energized by a transient change in liquid level as can arise when the vehicle travels over a bump, or is negotiating a curve.

It will be recognized that in the circuit of FIG. 8 there will be a similiar time period between return of the photo-diode 23 to a non-conducting state and de-energization of the indicator device 43. Moreover, if the vehicle negotiates a series of curves inter-spaced by short straight sections then the time periods during negotiation of the curves will be cumulative, and unless the of straight sections occupies the same, or a greater period of time then a point will be reached during one of the curves at which the capacitor 51 will have charged sufficiently to cause energization of the device 43.

FIG. 10 illustrates a circuit in which this problem is ovrrcome by "resetting" the time period every time the conductive state of the photo-diode changes. In FIG. 10 the polarities of the inputs of the operational amplifier 37 and 49 are reversed by comparison with FIG. 6, and the inverting input of the amplifier 49 is also connected through a diode 53 and the collector-emitter of an n-p-n transistor 54 to the output of the amplifier 37. Furthermore, the output of the amplifier 37 is connected through the emitter-collector of a p-n-p transistor 55 and a diode 56 to the inverting input of the amplifier 49. The output of the amplifier 49 is connected through a resistor 57 to the base of both transistor 54, 55. When the liquid level is high and the photo-diode 23 is thus non-conductive the output of the amplifier 37 is high and thus the inverting input of the amplifier 49 is high (it being assumed that the capacitor 51 is fully charged at this time). Thus the output of the amplifier 49 is low, the transistor 42 is switched off, and the device 43 is not energized. Additionally the transistor 54 is not conducting but the transistor 55 is on, and so can conduct. Should the coolant level now fall the photo-diode 23 will be "illuminated" and the voltage at the non-inverting input of the amplifier 37 will fall such that the output of the amplifier 37 goes low, thus turning off transistor 55. At this point therefore both transistors 54 and 55 are off and the discharge path for the capacitor 51 is by way of resistor 48. The capacitor 51 discharges at a rate determined by the capacitor 51 and resistor 48 and the output of the amplifier 49 remains high until the capacitor 51 has discharged sufficiently for the voltage at the inverting input to match the voltage at the non-inverting input. When this situation occurs the output of the amplifier 49 goes high switching on transistor 42 and thus switching on the indicator device 43. Immediately the output of the amplifier 49 goes high the transistor 54 is rendered conductive and thecapacitor 51 can then discharge fully, and immediately, by way of the diode 53 and the collector-emitter of the 54. Should the coolant level now be restored the photo-diode 23 will cease to conduct and the output of the amplifier 37 will go high. With the outputs of both amplifiers high both transistors 54 and 55 will be non-conductive and the capacitor 51 will charge, from a fully uncharged condition, at a rate determined by the capacitor 51 and the resistor 48. Thus there will be a predetermined period of time during which the capacitor 51 is charging before the voltage at the inverting input of the amplifier rises sufficiently to cause the output of the amplifier 49 to go low switching off the transistor 42 and the indicator device 43. As the output of the amplifier 49 goes low the transistor 55 will be rendered conductive, and the capacitor 51 will then be charged fully, quickly by way of the transistor 55 and the diode 56.

It will be recognised therefore that a predetermined continuous period of time, conveniently 30 seconds in a practical embodiment, must elapse during which the coolant level is low before the indicator 43 is energized. Similarly, while the indicator 43 is energized the same predetermined period of time must elapse during which the coolant level is high before the indicator device 43 is switched off. In this way transient changes in coolant level do not give rise to spurious operation of the indicator device 43.

Furthermore, in the event that the coolant level changes during the time that the capacitor 51 is charging or discharging then the time period set by the capacitor is reinitialized. Thus assuming that the coolant level has been high for a sufficient period of time to fully charge the capacitor 51, and has then dropped so that the output of the amplifier 37 has gone low then at this point in time the output of both amplifiers will be low, and the capacitor will be discharging through the resistor 48. Both transistor 54 and 55 will be non-conducting. If, while the capacitor 51 is discharging, and before the output of the amplifier 49 goes high (switching on the device 43) the coolant level is re-established then the output of the amplifier 37 will again go high rendering transistor 55 conductive and permitting the capacitor 51 to fully charge very quickly by way of the transistor 55 and the diode 56. A subsequent drop in coolant level will therefore need to be maintained for the full predetermined time period before the indicator device 43 becomes energized. Similiarly, when the coolant level has been low for a significant period of time and the capacitor 51 has fully discharged the output of amplifier 49 will be high, and if at that point the coolant level is re-established the output of the amplifer 37 will go high. At this point both transistors 54 and 55 will be non-conductive and the capacitor 51 will start to charge through the resistor 48. The device 43 will of course remain energized while the capacitor 51 is charging. If during this charging period the coolant level again drops then the output of the amplifier 37 will go low rendering the transistor 54 conductive and immediately discharging the capacitor 51 by way of the diode 53 and transistor 54.

It will be understood therefore that rapid changes in coolant level are not cumulative in the sense of using up the time period which must elapse before reversal of the status of the indicator device 43. It follows therefore that if the vehicle equiped with the system is negotiating a series of bends interspaced by straight stretches of road, then the coolant level may actually be acceptable, but during the negotiation of each bend the level may fall below the sensor as a result of movement of the coolant within the tank. However unless any one of the bends lasts for more than 30 seconds (or whatever predetermined period has been chosen) the low level indication will not be given by the device 43, and each return to the straight ahead condition (and therefore normal level within the tank) will initilized the predetermined period of time in readiness for the next bend.

It is to be recognized that the arrangements described above with reference to FIGS. 9 and 10 can be used with a wide variety of different sensor constructions, and is not restricted to use with the sensor constructions described herein.

I claim:

1. A liquid level sensor for attachment to the wall of a liquid container, the sensor comprising a support member adapted for attachment to the container wall and having a first surface which is presented towards the interior of the container during use of the sensor, an emitter carried by said support member in a position spaced from said first surface in a first direction away from an interior of the container, a receiver carried by said support member in a posiiton spaced from said first surface in a direction away from said container interior and spaced from said emitter transversely of said first direction, said receiver being sensitive to emissions of the emitter, baffle means carried by the support member between the emitter and the receiver to prevent said emissions reaching the receiver without first being reflected, the emitter being positioned on the support member such that the emission axis thereof is so disposed that when the liquid level in the container is high enough that the emissions encounter a liquid interface then said emissions generally in the direction of said emission axis will pass through the liquid interface and will be dissipated in the liquid, whereas when the liquid level is low such that said emissions encounter an air interface then said emssions will be totally internally reflected at said air interface so as to be received by said receiver, said receiver being adapted to produce an output signal dependent upon the presence or absence of reflected emissions, said baffle means terminating short of said first surface of said support member for preventing emissions of the emitter reaching the receiver without being reflected and for, in the event that the support member becomes detached from the container wall, permitting total internal reflection of said emissions at the first surface/air interface of the support member and permitting said totally internally reflected emissions occuring at the first surface/air interface to be received at said receiver.

2. A sensor as claimed in claim 1 wherein said emitter emits light in the infra red wavelengths.

3. A sensor as claimed in claim 1 wherein said baffle means comprises an opaque member positioned between the receiver and the emitter.

4. A sensor as claimed in claim 1 wherein said receiver produces an electrical output when emissions from said emitter are incident upon the receiver.

5. A sensor as claimed in claim 4 wherein said receiver includes a photo-diode which is electrically conductive when said emissions are incident thereupon, and so produces an electrical output signal.

6. An indicator system for indicating the presence or absence of liquid at a predetermined level in a container, the system comprising a sensor as claimed in claim 1, a comparator comparing the output of the receiver with a reference value, and an indicator device operation of which is controlled by the output of the comparator.

7. An indicator system as claimed in claim 6 wherein the comparator is arranged to exhibit hysteresis such that the indicator device is switched on and off at different output levels respectively of the sensor.

8. An indicator system as claimed in claim 6 wherein there is provided latching means whereby the indicator device, once rendered operative, remains operative until manually reset.

9. An indicator system as claimed in claim 6 including means whereby in order to effect a change in the operative state of the indicator device the changed operative state of the sensor must have persisted for a predetermined period of time.

10. An indicator system as claimed in claim 9 so arranged that return of the sensor to its first state within said predetermined period of time immediately negates the effect of the previous change of state in that for a subequent change of state, from said first state, the time period during which the changed state must prevail, before the operative state of the indicator device is changed, is recommenced.

11. An indicator system for indicating the presence or absence of liquid at a predetermined level in a container, the system comprising a sensor which produces an electrical output signal either when liquid is present at the predetermined level, or alternatively when liquid is absent at the predetermined level, a comparator which compares the output signal from the sensor with a predetermined reference, and an indicator device operable by the output of the comparator, the sensor thus having first and second alternative operative states, and the indicator device having alternative first and second operative states, and the system being so arranged that in order to effect a change in the operative state of the indicator device, a change in the operative state of the sensor must persist for a predetermined length of time, and furthermore the system being such that a return of the sensor to the previous operative state before elapse of predetermined period of time negates the effect of the previous change of state of the sensor in that a subsequent change of state of the sensor must persist for the full predetermined period of time before a change in operative state of the indicator device is effected.

* * * * *